United States Patent [19]

Harford

[11] 4,212,032

[45] Jul. 8, 1980

[54] SYNCHRONIZATION AND GAIN CONTROL CIRCUIT

[75] Inventor: Jack R. Harford, Flemington, N.J.

[73] Assignee: RCA Corporation, New York, N.Y.

[21] Appl. No.: 934,822

[22] Filed: Aug. 18, 1978

[51] Int. Cl.² ............................................. H04N 5/52
[52] U.S. Cl. .................................... 358/177; 358/157; 358/178
[58] Field of Search ........................ 358/177, 178, 157

[56] References Cited

U.S. PATENT DOCUMENTS

| 3,624,288 | 11/1971 | Hofmann | 358/157 |
| 3,624,290 | 11/1971 | Hofmann | 358/177 |
| 3,740,471 | 6/1973 | Wilcox | 358/178 |

OTHER PUBLICATIONS

*RCA Linear Integrated Circuit Databook*, pp. 355–358, Aug. 1977.

*Primary Examiner*—Richard Murray
*Attorney, Agent, or Firm*—Eugene M. Whitacre; William H. Meagher; W. Brinton Yorks, Jr.

[57] ABSTRACT

A circuit is provided for developing a television synchronization signal and an automatic gain control (AGC) signal. A composite video signal is coupled to the input of a D.C. threshold noise inverter which inverts impulse noise above a predetermined threshold level. The inverted noise signal and a delayed video signal are coupled to a peak detecting sync separator which generates a noise-free sync signal. The noise-free sync signal is coupled to a latching circuit, where it is combined with a horizontal retrace (flyback) signal to produce an AGC keying signal of constant pulse width. An AGC circuit is keyed by the AGC keying signal to generate an AGC control signal from the composite video signal. The time constant of the peak detecting sync separator performs the dual functions of tracking the sync signal of the composite video signal and preventing lockout of the keyed AGC circuit.

8 Claims, 6 Drawing Figures

SYNCHRONIZATION AND GAIN CONTROL CIRCUIT

This invention relates to a television signal synchronization and gain control circuit, and more particularly to a circuit which develops a noise-free synchronization signal and an automatic gain control (AGC) signal from a composite video signal while minimizing the occurrence of AGC noise set-up and lockout.

In accordance with television transmission standards, the composite video signal includes periodically recurring horizontal and vertical synchronizing pulses for synchronizing the scanning circuits associated with the kinescope in the television receiver and the scanning circuits associated with the image pick-up device at the television transmitting station. In the composite video signal, the horizontal and vertical synchronizing pulses all are of substantially the same amplitude with respect to a reference level, the reference level being defined in terms of a particular brightness condition (e.g., an arbitrary black level) in the televised image. Television receivers include a synchronizing signal separator circuit capable of differentiating between the reference or black level of the video signal and the tips of the synchronizing pulses so as to strip off or respond only to signals in a range commencing at or near the reference black level and including the sync pulses. Frequently, unwanted noise is present in the composite video signal and such noise may extend to a level beyond the sync pulse tips. Noise of such magnitude may cause spurious operation of the synchronizing circuits and/or may produce a condition in the sync separator circuit known as "noise set-up".

AGC circuits are commonly used in television receivers to derive a suitable control voltage for application to the radio frequency (RF) and intermediate frequency (IF) amplifier stages of the receiver. The control voltage is effective to vary the gain of the stages inversely in accordance with the level of the synchronizing pulse components of the video signal so as to provide a constant peak amplitude composite video signal.

It is customary in television receivers to derive the AGC signal by sampling the peak level of the synchronizing pulse components of the composite video signal. A peak detector may be utilized to sample the sync pulses, but because such a detector is quite susceptible to impulse noise, means are generally provided to gate "on" the AGC circuit only during the relatively short horizontal retrace (flyback) pulses produced by the horizontal deflection system. The horizontal retrace pulses are normally locked in phase with the sync pulses produced by the sync separator. In this way, impulse noise occurring in the video signals during the remainder of the line scanning period cannot affect the operation of the AGC circuit. However, noise set-up in the sync separator can cause noise-generated sync pulses, which shift the phase of the horizontal retrace pulses relative to the composite video signal, resulting in sampling of the video signal level instead of the sync tip level.

Prior art sync separator and AGC circuits have commonly included noise protection circuits to inhibit noise set-up of the sync separator. A typical noise protection circuit will clip impulse noise at a level just above the sync tip level. While this technique effectively removes large amplitude noise pulses from the composite video signal, it nevertheless couples clipped noise pulses to the sync separator, which may be incorrectly interpreted as sync pulses.

An improved noise protection circuit comprises a noise inverter circuit which inverts impulse noise in the composite video signal. Such noise inversion circuits utilize either a D.C. threshold or an A.C. threshold for the detection of impulse noise and the generation of inverted noise pulses. The inverted noise pulses are additively combined with the composite video signal to cancel the impulse noise. To ensure complete cancellation of the leading edges of the impulse noise, it is desirable to delay the video signal before it is combined with the inverted noise pulses. It is also desirable to stretch the inverted noise pulses so that the trailing edges of the impulse noise are completely cancelled. However, delaying the video signal can result in a narrowing of the bandwidth-reduced sync pulses in the composite video signal, which can appreciably reduce the pulse width of the already short equalizing pulses. Too much delay of the video signal will present an unacceptably bandreduced signal at the input to the sync separator, which will then generate sync pulses having less than nominal pulse widths.

In accordance with the present invention, a D.C. threshold noise inverter is used to invert impulse noise in the composite video signal. A D.C. threshold noise inverter is used because A.C. threshold circuits have detection thresholds which undesirably increase when subjected to bursts of high energy noise. Moreover, A.C. threshold circuits utilize R-C components which do not readily lend themselves to integrated circuit construction.

The composite video signal is also coupled to an active filter which delays the video signal and combines it with the inverted noise pulses produced by the noise inverter, thereby producing a noise cancelled composite video signal at the output of the filter. Delaying the video signal ensures that the inverted noise pulses will cancel substantially all of the leading edges of noise pulses in the delayed video signal. The active filter also delays the termination of the inverted noise pulses, resulting in substantially complete cancellation of the trailing edges of the noise pulses. The filter includes feedback means to improve the transition time of the leading edges of the synchronizing signal components, thereby ensuring that sync and equalizing pulses of adequate duration are available for detection and separation by the sync separator.

The noise cancelled video signal is coupled to a peak detecting sync separator. The sync separator produces a noise-free sync signal which is coupled through an output waveshaping circuit to the horizontal and vertical deflection systems in the television receiver and to a latching circuit. The latching circuit is responsive to the coincidence of the sync pulses and horizontal retrace (flyback) pulses from a transformer associated with the horizontal deflection system for the generation of an AGC keying signal. The keying signal is applied to a peak detecting sample and hold AGC circuit, which samples the sync pulse tips during the keying pulse intervals. The AGC circuit produces an AGC control voltage to control the gain of the R.F. and I.F. amplifying stages in the television receiver.

When the television receiver is initially turned on, or switches from a weak signal channel to a strong signal channel, it is possible that the signal presented to the D.C. threshold sync separator will have an amplitude which is continually in excess of the noise inverter threshold if the R.F. and I.F. amplifying stages are in a high gain condition. Such a signal will be processed by the noise inverter as a constant noise pulse, causing the entire video signal to be cancelled at the output of the active filter. The cancelled signal coupled to the sync separator will approximate an unmodulated D.C. signal and the sync separator will produce no separated sync pulses. Since the latching circuit generates an AGC keying signal only upon the coincidence of a sync pulse and a horizontal retrace pulse, no keying signal will be coupled to the AGC circuit and the gain of the R.F. and I.F. amplifying stages will not change. This condition, in which a strong video signal disables the sync separator and locks out the AGC circuit, is called a "lockout" condition.

AGC lockout is prevented in the present invention by the use of a peak detecting sync separator. Upon reception of an unmodulated D.C. signal from the noise inverter, the time constant of the peak detector will cause the sync separator to generate a continuously "high" sync signal. This "high" sync signal will enable the latching circuit upon reception of a horizontal retrace pulse, thereby generating an AGC keying signal. The AGC circuit will thus respond to the strong composite video signal by quickly modifying the AGC control voltage, which reduces the gain of the R.F. and I.F. amplifying stages. The lockout condition is therefore overcome and normal operation of the television receiver is promptly restored.

A problem similar to lockout can occur when the television receiver switches from a strong to a weak signal channel. In this situation, the R.F. and I.F. amplifying stages are in a minimum gain condition and the composite video signal which is presented to the sync separator is too weak to develop a sync signal. It is thus desirable to rapidly change the AGC control voltage to increase the gain of the R.F. and I.F. stages, but the absence of a sync signal at the latching circuit prevents the generation of an AGC keying signal.

This problem is overcome in the present invention by the novel latching circuit. Upon reception of a horizontal retrace pulse which is not in coincidence with a sync pulse, the latching circuit pulses the AGC circuit so as to slowly change the AGC control voltage in a direction which gradually increases the gain of the R.F. and I.F. amplifying stages. Simultaneously, the latching circuit enables a sync separator recovery circuit, which rapidly changes the threshold of the peak detector in a direction which detects a weaker level signal. Therefore, the video signal level will increase with increasing gain in the R.F. and I.F. amplifying stages and the peak detecting sync separator will rapidly reacquire detection of the synchronizing signal components of the composite video signal.

Figure 1:
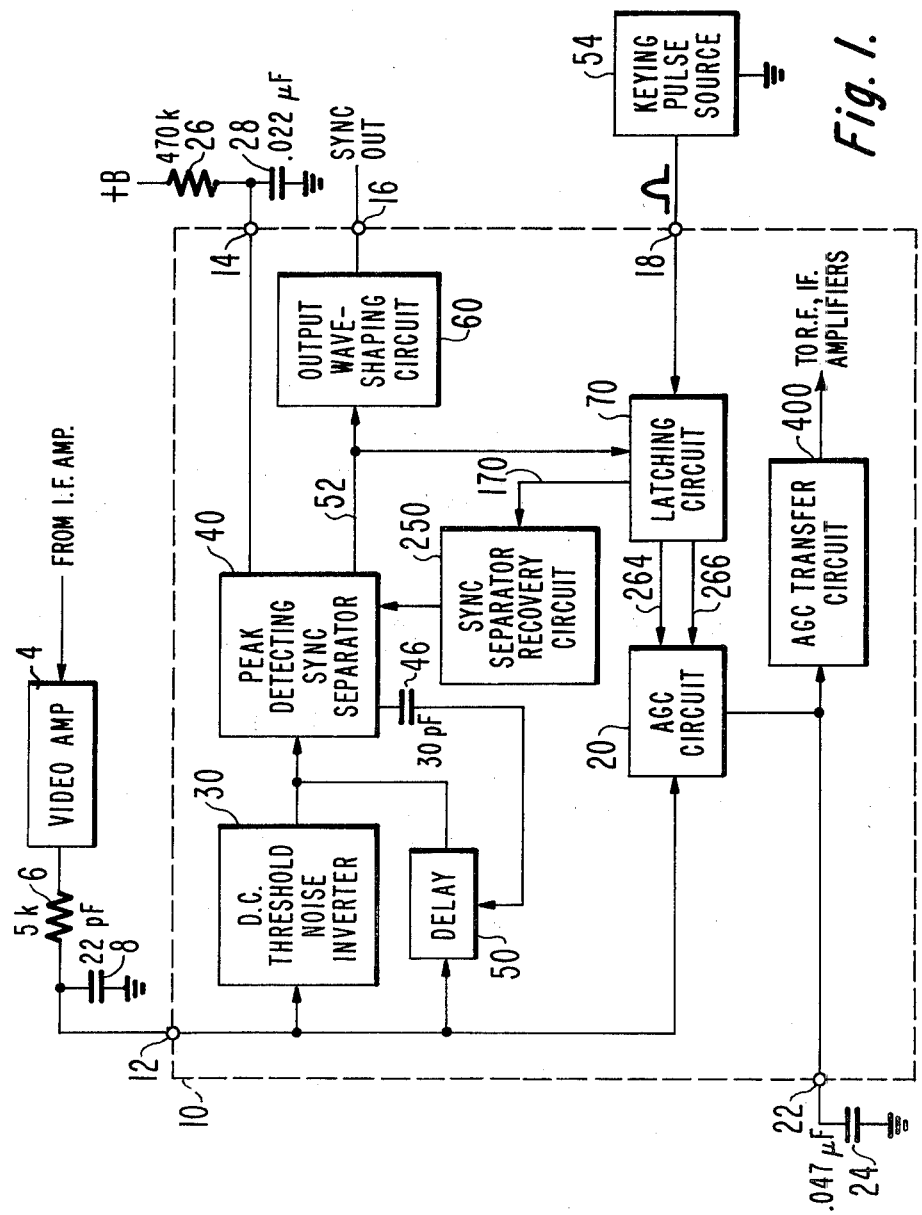
FIG. 1 illustrates, in block diagram form, a sync separator and AGC circuit constructed in accordance with the principles of the present invention.
Figure 5:
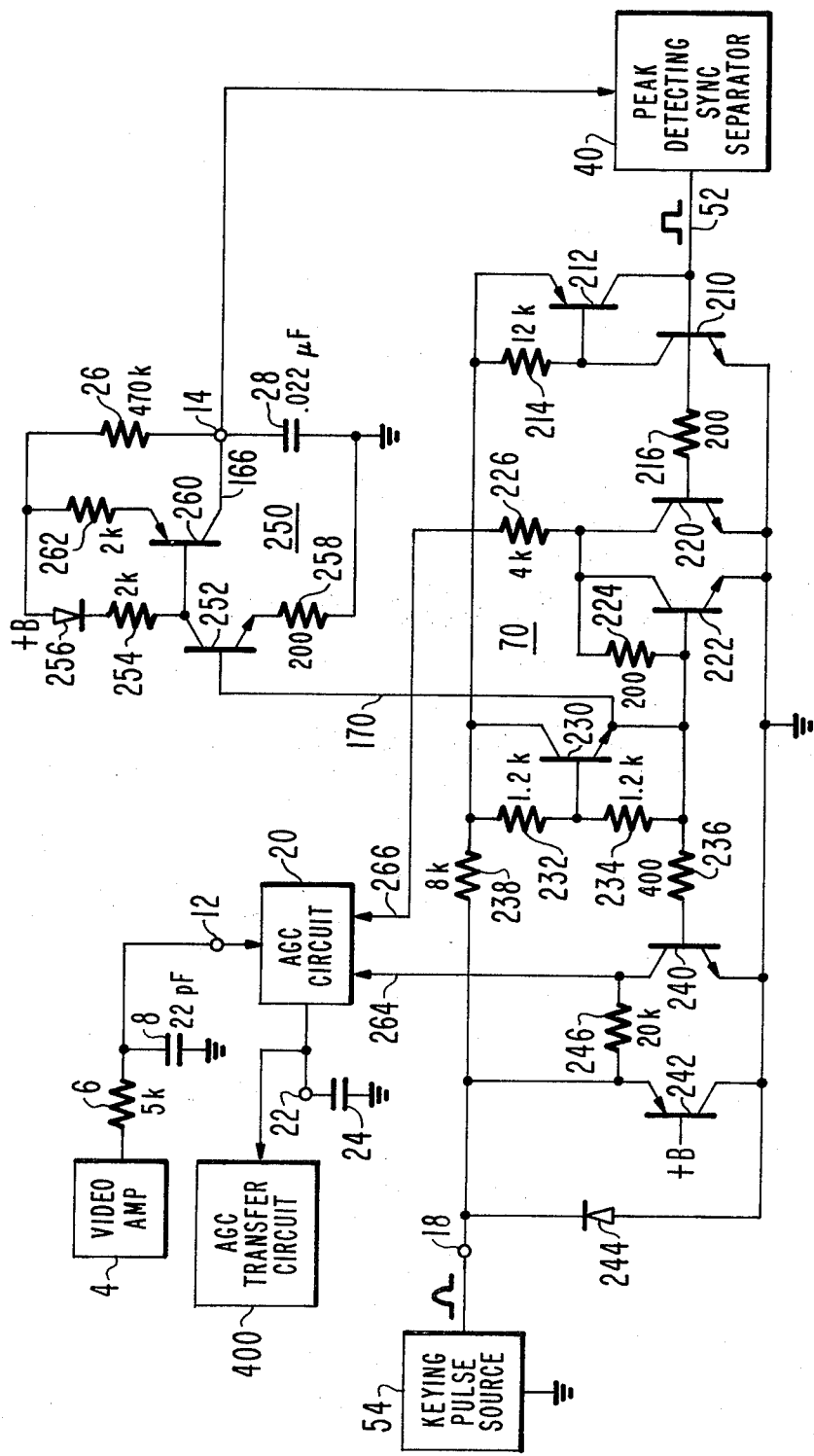
Figure 6:
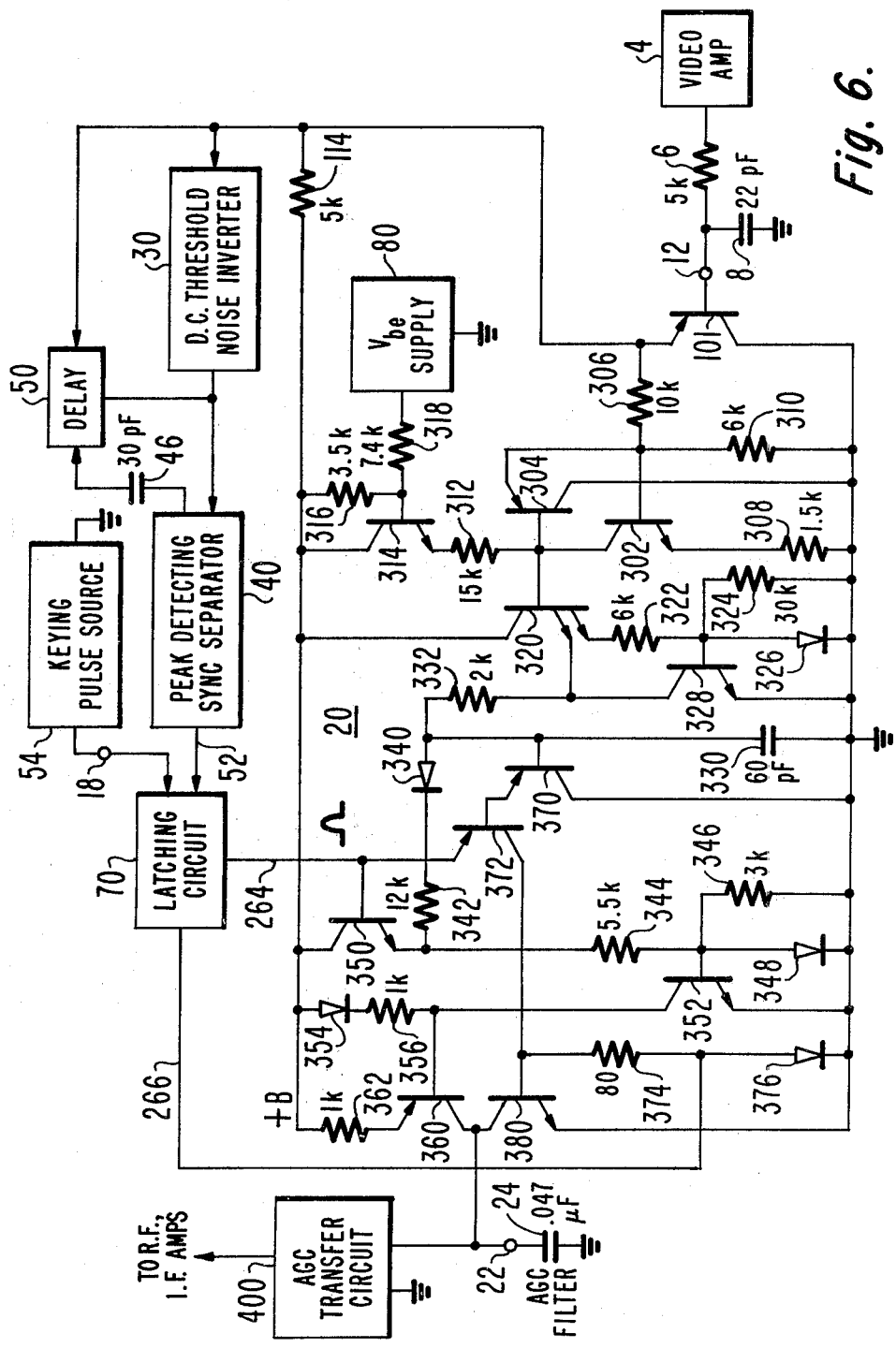

FIG. 5 illustrates, partially in block diagram form and partially in schematic diagram form, a latching circuit and a sync separator recovery circuit which may be used in the embodiment of the present invention shown in FIG. 1; and FIG. 6 illustrates, partially in block diagram form and partially in schematic diagram form, a peak detecting sample-and-hold AGC circuit which may be used in the embodiment of the present invention shown in FIG. 1.

Referring now to FIG. 1 of the drawings, the dashed rectangle 10 schematically represents a monolithic semiconductor integrated circuit chip. As used herein, the term integrated circuit refers to a unitary or monolithic semiconductor device or chip which is the equivalent of a network of interconnected active and passive circuit elements. A plurality of contact areas or terminals are disposed about the periphery of chip 10 through which external connections to various circuits on the chip can be made.

An intermediate frequency (I.F.) signal from an I.F. amplifier in a television receiver is applied to an input of a video amplifier 4.

A composite video signal is detected and amplified by the video amplifier 4 and coupled by a low pass filter consisting of a resistor 6 and a shunt capacitor 8 to an input terminal 12 of integrated circuit 10. The composite video signal is coupled from terminal 12 to a D.C. threshold noise inverter 30, an AGC circuit 20, and an active filter delay 50. The video signal is delayed by active filter delay 50 and coupled to the output of noise inverter 30. The output of noise inverter 30 is coupled to a peak detecting sync separator 40.

Sync separator 40 includes a peak detector which detects the tips of the synchronizing signal components of the composite video signal. The peak detector time constant includes a capacitor 28 coupled between terminal 14 and a point of reference voltage (ground), and a resistor 26 coupled between terminal 14 and a source of supply voltage (+B). Resistor 26 and capacitor 28 are externally connected to chip 10 and are coupled internally to sync separator 40 from terminal 14.

The output of sync separator 40 is direct current coupled to an output waveshaping circuit 60 and a latching circuit 70 by conductor 52. Output waveshaping circuit 60 produces a shaped and amplified sync signal at chip terminal 16. Latching circuit 70 receives a second input signal from a keying pulse source 54 by way of chip terminal 18. Keying pulse source 54 supplies recurrent horizontal retrace (flyback) voltage pulses derived, for example, from a transformer associated with the horizontal deflection circuit of the television receiver. Upon the coincidence of a sync pulse and a horizontal retrace pulse, latching circuit 70 produces an AGC keying signal on conductor 264 which is direct coupled to an AGC circuit 20. A sync separator recover circuit 250 is coupled between latching circuit 70 and sync separator 40 to change the threshold of the peak detecting sync separator when synchronization is lost due to reception of a weak video signal. Latching circuit 70 also produces a small voltage pulse on conductor 266 when a horizontal retrace pulse is received which is not in coincidence with a sync pulse. AGC circuit 20 responds to the signals on conductors 264 and 266 by generating an AGC control voltage at chip terminal 22. The AGC control voltage is distributed to the R.F. and I.F. amplifying stages of the television receiver by an AGC transfer circuit 400. The AGC control voltage is stored on external capacitor 24.

In operation, the circuit of FIG. 1 provides a noise-immune sync signal and AGC control voltage from the composite video signal. The D.C. threshold noise inverter requires no external components, and the peak detector of the sync separator performs the two functions of tracking the synchronizing signal component of the composite video signal and preventing AGC lockout. The resulting system is of high performance and low cost.

When a composite video signal contaminated with impulse noise is coupled to terminal 12, noise inverter 30 produces an output signal containing inverted noise pulses whenever the impulse noise exceeds the D.C. threshold of the noise inverter. The composite video signal is delayed and coupled to the output of the noise inverter 30 by active filter delay 50. The restricted bandwidth video signal coupled to the output of noise inverter 30 by the active filter delay 50 is delayed such that impulse noise in the video signal appears at the noise inverter output after the generation of correlated inverted noise pulses. The duration of the inverted noise pulses exceeds the pulse width of the impulse noise at the output of the active filter delay 50, so that the impulse noise in the composite video signal which is coupled to the sync separator 40 is cancelled. Feedback capacitor 46 couples the noise-cancelled video signal back to the active filter delay 50 from the input to the sync separator to provide improved transition times for the leading edges of the synchronizing signal components of the composite video signal.

The synchronizing signals of the composite video signal are peak detected by sync separator 40. The peak value of the horizontal sync, vertical sync and equalizing pulses are stored by a peak detector and compared with the video signal to enable the generation of a synchronizing signal. In this regard, it should be noted that the bandwidth reduction provided by active filter delay 50 does not appreciably affect the peak detected pulse widths of the sync pulses because the transition times of the sync signals have been enhanced by the operation of feedback capacitor 46. In this way, the present invention provides a noise-cancelled sync signal, while minimizing the amount of pulse width degradation of the sync pulses to permit an accurate peak value to be stored by the peak detector.

Since the D.C. signal level stored by the peak detector varies with changes in the video sync tip level, the sync separator will respond quickly to sudden changes in signal level (e.g., changes resulting from television channel switching). The coupling of the D.C. threshold noise inverter through the peak detecting sync separator prevents AGC lockout caused by the cancellation of the entire video signal by the noise inverter when the television system is switched to a strong video signal. Under these conditions, the sync separator 40 will produce a constant "high" sync signal to enable the latching circuit 70 which keys AGC circuit 20.

The noise-cancelled sync signal produced by sync separator 40 is coupled to the output waveshaping circuit 60 and the latching circuit 70. Waveshaping circuit 60 operates to improve the sync signal in several ways. First, the sync signal has a rapid falltime which, when amplified, can cause radiation problems on the wires which conduct the sync signal to other receiver components. Waveshaping circuit 60 acts to reduce radiation problems by slowing the falltime of the sync signal produced at terminal 16 of chip 10. Second, waveshaping circuit 60 amplifies the sync signal to provide a 25 volt, 5 milliamp drive signal at terminal 16.

Latching circuit 70 is a logical "AND" gate which generates a keying pulse for AGC circuit 20 upon the coincidence of a sync pulse and a horizontal retrace pulse from keying pulse source 54. Latching circuit 70 contains a transistor latch which is latched by the coincidence of these pulses, thereby permitting the application of a keying pulse to AGC circuit 20. The keying signal coupled to AGC circuit 20 by conductor 264 has a pulse duration substantially equal to that of the horizontal retrace pulse, regardless of the sync pulse width. Latching circuit 70 will generate no keying signal on conductor 264 when the sync signal and the horizontal retrace pulse are not in coincidence. Sync separator 40 and latching circuit 70 cooperate to prevent AGC lockout due to the sudden reception of a strong video signal by the sync separator. Under this condition, sync separator 40 will generate a constant "high" sync signal which will enable the transistor latch upon reception of a horizontal retrace pulse, thereby transmitting a keying signal to the AGC circuit 20 on conductor 264 to ensure AGC control of the R.F. and I.F. amplifying stages.

AGC circuit 20 includes a sample-and-hold peak detector which samples the sync tip level of the composite video signal upon the application of a keying signal by latching circuit 70 on conductor 264. During the keying signal duration of approximately 12 microseconds, the video signal level is sampled and the maximum sync tip level is stored by the peak detector and translated to the AGC filter capacitor 24. The AGC control voltage generated across capacitor 24 is thus a function of the sync tip amplitude stored on the peak detector, and is independent of the duration of the sampled sync pulse. AGC circuit 20 will therefore generate an amplitude-dependent AGC control signal, regardless of whether the sampled pulse is a narrow equalizing pulse, a horizontal sync pulse, or a broad vertical pulse.

Figure 2:
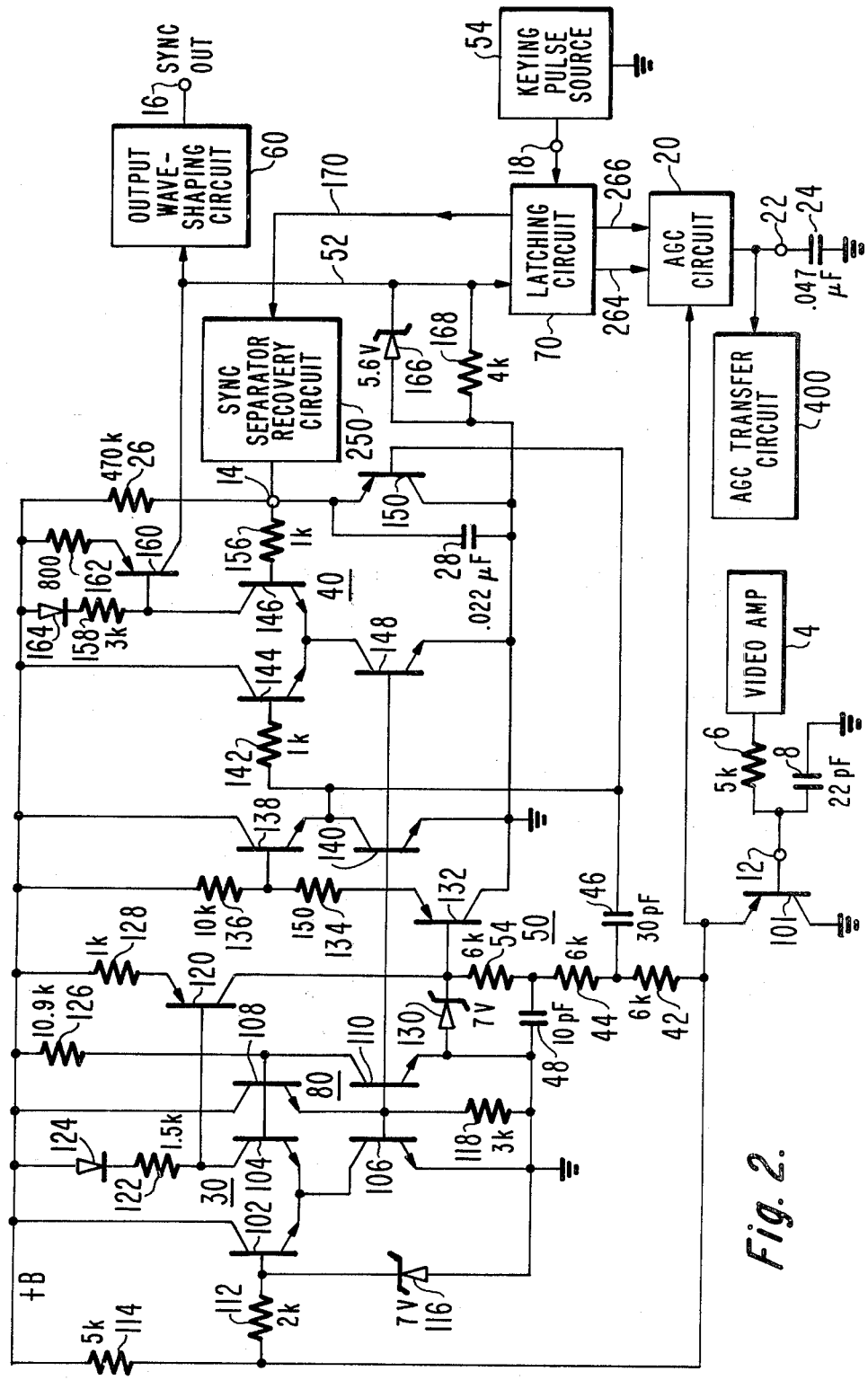
FIG. 2 illustrates, partially in block diagram form and partially in schematic diagram form, a noise inverter, an active filter, and a peak detecting sync separator which may be used in the embodiment of the present invention shown in FIG. 1.

FIG. 2 is a schematic illustration of D.C. threshold noise inverter 30 and peak detecting sync separator 40. A detailed discussion of this circuit is found in my copending U.S. patent application, Ser. No. 934,829, entitled, "Noise Cancellation Circuit", filed concurrently herewith. A negative-going composite video signal from video amplifier 4 is coupled to noise inverter 30 and active filter delay 50 at terminal 12 by a lowpass filter comprised of series resistor 6 and shunt capacitor 8. The video signal is coupled to the base of transistor 101, which has its collector grounded. The video signal is distributed to noise inverter 30, active filter delay 50 and AGC circuit 20 from the emitter of transistor 101. The video signal is coupled to the base of a noise inverter transistor 102 by resistor 112. Noise inverter transistors 102 and 104 comrise a differential amplifier which detects noise pulses in the video signal. The base of transistor 102 is protected against overvoltage conditions by zener diode 116. The cathode of zener diode 116 is coupled to the junction of resistor 112 and the base of transistor 102 and the anode is coupled to ground. Bias current for the base of transistor 102 is supplied by resistor 114, which is coupled between the junction of resistor 112 and terminal 12 and the +B supply. The collector of transistor 102 is coupled to the +B supply and the emitter of transistor 102 is coupled to the emitter of transistor 104 and the collector of transistor 106. A source of constant current for the differential amplifier is supplied by transistor 106, which has its emitter electrode coupled to ground and its base electrode coupled to a $V_{be}$ supply 80.

$V_{be}$ supply 80 is comprised of transistors 108 and 110 and resistors 118 and 126 and supplies $V_{be}$ voltages to noise inverter 30 and sync separator 40. Transistor 110 has its emitter electrode coupled to ground and its collector electrode coupled to the base of transistor 108 and resistor 126. The resistor 126 is coupled to the +B supply. Transistor 108 has its collector electrode coupled to the +B supply and its emitter electrode coupled to the base of transistor 110. Resistor 118 is coupled to ground from the junction of the base of transistor 110 and the emitter of transistor 108. In this configuration, a one $V_{be}$ voltage (approximately 600 millivolts) is supplied at the base of transistor 110 and a 2 $V_{be}$ voltage (approximately 1.2 volts) is supplied at the base of transistor 108. $V_{be}$ supply 80 provides a one $V_{be}$ voltage to the bases of current source transistors 106, 140 and 148, and a 2 $V_{be}$ voltage to the base of transistor 104.

The collector electrode of differential amplifier transistor 104 is coupled to the base of transistor 120 and to a bias resistor 122. Resistor 122 is coupled to the cathode electrode of diode 124, which has its anode electrode coupled to the +B supply. Diode 124 acts to limit the base voltage of transistor 120 to a level which is at least one $V_{be}$ below the level of the +B supply.

Transistor 120 is a PNP transistor which has its emitter electrode coupled to the +B supply by resistor 128. Inverted impulse noise is produced at the collector of transistor 120 and is coupled to the junction of resistor 54 and the base of transistor 132. Zener diode 130 has its cathode electrode coupled to the collector electrode of transistor 120 and its anode electrode coupled to ground and clamps the collector electrode of transistor 120 to a maximum value of seven volts. The zener diode clamp keeps transistor 120 from saturating by way of resistors 42, 44 and 54, and also prevents a reverse breakdown of the base-emitter junction of transistor 146 in the sync separator, which would cause a false charging of capacitor 28 of the peak detector.

The composite video signal is also coupled to the collector of transistor 120 by way of low pass filters comprised of resistor 42 and capacitor 46, and resistor 44 and capacitor 48, and resistor 54 of active filter delay 50. Resistors 42, 44 and 54 are series connected from the emitter of transistor 101 to the junction of the collector of transistor 120 and the base of transistor 132, and capacitor 48 is coupled to ground from the junction of resistors 44 and 50.

Follower transistor 132 translates the voltage level of the noise-cancelled signal which is applied at its base electrode. The collector electrode of transistor 132 is coupled to ground and its emitter electrode is coupled to the base of follower transistor 138 by resistor 134. Supply current for transistor 132 and bias current for transistor 138 is provided by resistor 136, which is coupled between the +B supply and the junction of resistor 134 and the base of transistor 138.

Follower transistor 138 has its collector electrode coupled to the +B supply and its emitter electrode coupled to resistor 142, the base of transistor 150, the collector of transistor 140 and feedback capacitor 46. Current source transistor 140 has its emitter electrode coupled to ground and its base electrode coupled to the one $V_{be}$ supply point of $V_{be}$ supply 80 and provides a source of constant current to the emitter of transistor 138. Capacitor 46 feeds the signal produced at the emitter of transistor 138 back to the video signal input of active filter delay 50 at the junction of resistors 42 and 44.

Sync separator 40 comprises a differential amplifier coupled to a peak detector. the differential amplifier includes transistors 144 and 146. The noise-cancelled video signal supplied by transistor 138 is coupled to the base of differential amplifier transistor 144 by resistor 142. The collector of transistor 144 is coupled to the +B supply and the emitter of transistor 144 is coupled to the emitter of differential amplifier transistor 146 and the collector of transistor 148. Transistor 148 provides a source of constant current for the differential amplifier and has its emitter electrode coupled to ground and its base electrode coupled to the one $V_{be}$ supply point of $V_{be}$ supply 80. Transistor 146 has its base electrode coupled to peak detector capacitor 28 by resistor 156 and its collector electrode coupled to the base of transistor 160. Supply voltage for transistor 146 is provided by resistor 158, which is coupled between the collector of transistor 146 and the cathode of diode 164. The anode of diode 164 is coupled to the +B supply, which limits the maximum voltage at the base of transistor 160 to one $V_{be}$ below the voltage level of the +B supply.

The sync separator output signal is available at the collector of transistor 160, which is coupled to ground through load resistor 168. Overvoltage protection is provided by zener diode 166, which has its anode coupled to ground and its cathode coupled to the collector of transistor 160. The sync separator output signal is also coupled to latching circuit 70 and output waveshaping circuit 60.

The noise-cancelled composite video signal supplied by transistor 138 is also coupled to the base of peak detector transistor 150. Transistor 150 is coupled across external capacitor 28 at terminal 14, having its collector electrode coupled to ground and its emitter electrode coupled to the junction of capacitor 28 and resistors 156 and 26. Resistor 26 is coupled to the +B supply to provide a source of charging current for capacitor 28. The junction of capacitor 28 and resistor 26 is also coupled to the output of sync separator recovery circuit 250.

Figure 3:
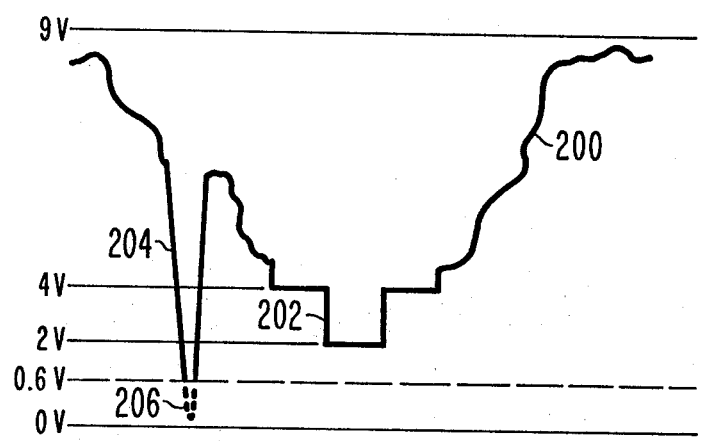
FIG. 3 illustrates a composite video signal containing impulse noise.

A typical negative-going composite video signal 200 which is coupled to terminal 12 is illustrated in FIG. 3. The video signal has a maximum value (white level) of 9 volts and a pedestal level (black level) of 4 volts. Sync pulse 202 has an amplitude of 2 volts below the pedestal level and the sync pulse tip is nominally 2 volts above ground.

Video signal 200 is seen to contain an impulse noise pulse 204. The dashed portion 206 of impulse noise pulse 204 represents that portion of the pulse which extends beyond the 0.6 volt threshold level of D.C. threshold noise inverter 30.

The operation of the noise inverter and sync separator of FIG. 2 upon application of video signal 200 at terminal 12 will now be discussed. The video signal from video amplifier 4 is translated up one $V_{be}$ by transistor 101 and coupled to the base of transistor 102. Transistor 102 in the noise inverter is normally saturated, while transistor 104 is normally nonconducting. A D.C. threshold of 1.2 volts is maintained at the base of transistor 104 by $V_{be}$ supply 80. When noise pulse 204 at the base of transistor 102 drops below the 1.2 volt threshold by more than 100 millivolts, transistor 102 begins to come out of saturation and transistor 104 starts to conduct. The flow of collector current in transistor 104 decreases the voltage level at the base of transistor 120 and causes transistor 120 to turn on. An inverted noise pulse is thus produced at the collector of transistor 120.

Concurrent with the processing of impulse noise by noise inverter 30, noise-contaminated composite video signal 200 is coupled to the collector of transistor 120 by active filter delay 50, including capacitors 46 and 48, and resistors 42, 44 and 54. These components of active filter delay 50 delay the coupling of the video signal to transistor 120 so that the inverted noise signal appears at the collector of transistor 120 prior to the arrival of noise pulse 204 by way of the active filter delay 50. The active filter delay 50 also delays the termination of the inverted noise signal at the collector of transistor 120 by virtue of the charge stored by capacitors 46 and 48. The inverted noise signal will both precede and outlast the duration of noise pulse 204 at the collector of transistor 120, resulting in substantially complete cancellation of noise pulse 204 in the composite video signal at the base of transistor 132.

The noise-cancelled video signal is coupled through two emitter-follower transistors 132 and 138 of the active filter delay 50, producing a low impedance signal at the emitter of transistor 138. This signal is fed back to the output of the noise inverter by capacitor 46, which acts to improve the rise times of the sync pulses in the composite video signal. The feedback signal causes the sync pulses to reach their maximum amplitude sooner, with a small amount of overshoot. The low impedance presented to capacitor 46 by the emitter of transistor 138 prevents the coupling of the noise-contaminated video signal into the sync separator through capacitor 46. Transistor 138 also provides a signal with better frequency response than that provided by PNP transistor 132 acting alone.

The noise-cancelled video signal is coupled to sync separator 40 at the base of differential amplifier transistor 144 and to the base of peak detector transistor 150. The voltage level stored on peak detector capacitor 28, approximately 3 volts in normal operation, is coupled to the base of differential amplifier transistor 146. When the leading edge of the sync pulse at the base of transistor 144 falls to a level which is one $V_{be}$ (600–700 millivolts) below the 3 volt level on the base of transistor 146, transistor 144 begins to come out of conduction and transistor 146 starts to conduct. The current flow in the collector of transistor 146 causes transistor 160 to turn on, producing a positive-going sync pulse at the collector of transistor 160. The sync tip level of 2 volts of sync pulse 202 is translated up 2 $V_{be}$'s by transistors 101 and 150, and stored on capacitor 28. At the end of the sync pulse 202, the rising edge of the pulse at the base of transistor 144 will increase to a level which is one $V_{be}$ above the sync tip level and transistors 146 and 160 will again turn off, terminating the sync pulse output at the collector of transistor 160. The sync tip level is stored by the peak detector on capacitor 28 until the next synchronizing signal interval. Between sync pulses, the voltage stored on capacitor 28 will increase slightly due to the flow of charging current from the +B supply through resistor 26.

An output waveshaping circuit 60 is coupled to the output of sync separator 40 by conductor 52. This circuit prevents radiation of the sync output signal at R.F. and I.F. frequencies at terminal 16. Output waveshaping circuit 60 is shown in schematic detail in FIG. 4.

Figure 4:
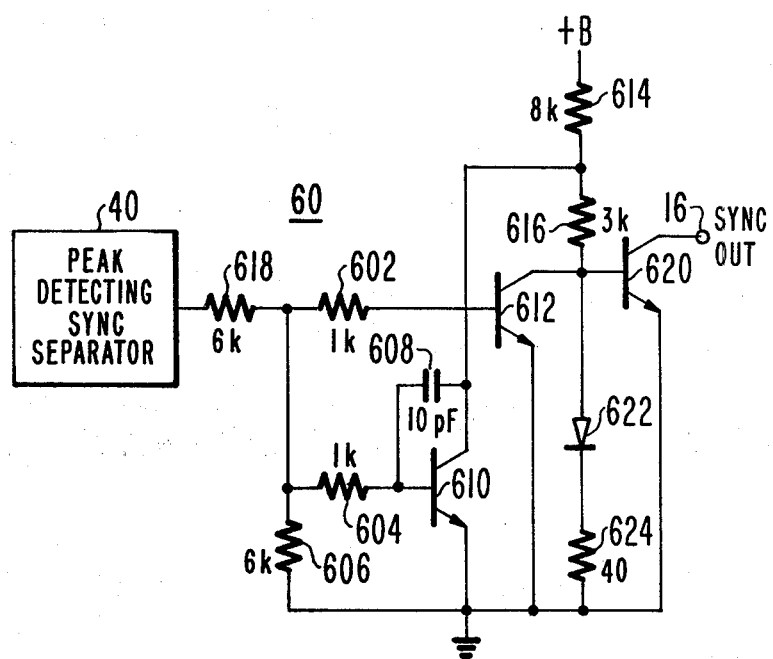
FIG. 4 illustrates, partially in block diagram form and partially in schematic diagram form, an output waveshaping circuit which may be used with the peak detecting sync separator shown in FIG. 2.

Referring to FIG. 4, a positive sync signal is coupled to output waveshaping circuit 60 from sync separator 40 by a resistor 618. The sync signal is coupled from resistor 618 to the base of a common emitter transistor 612 by a resistor 602, and to the base of a Miller integrator transistor 610 by a resistor 604. The sync signal is also coupled to ground at the junction of resistors 618, 602 and 604 by a resistor 606.

Transistor 612 produces an inverted sync signal at its collector electrode, which is coupled to the base of an output transistor 620. The emitter of transistor 612 is coupled to ground. Transistor 610 has Miller integrating capacitor coupled between its base and collector electrodes, and has its emitter coupled to ground. The collector of transistor 610 is coupled to the base of transistor 620 by a resistor 616. Base bias current for transistor 620 is provided by resistor 614, which is coupled to the +B supply from the junction of the collector of transistor 610 and resistor 616.

The base of transistor 620 is coupled to ground by the connection of a diode 622 and a resistor 624. Diode 622 has its anode coupled to the base of transistor 620 and its cathode coupled to resistor 624. Resistor 624 couples the cathode of diode 622 to ground.

A sync output signal is developed at the collector of transistor 620, which is coupled to external terminal 16. The emitter of transistor 620 is coupled to ground.

The positive-going sync pulse produced at the output of sync separator 40 has sharply rising and falling edges. If this signal were coupled directly to output terminal 16, the sharp falling edge of the sync signal would contain sufficient energy to radiate undesired noise at the R.F. and I.F. frequencies. The present invention prevents this undesirable radiation by increasing the fall time of the trailing edges of the sync pulse, while providing a high voltage sync signal to circuitry external to terminal 16.

Transistor 620 is normally saturated and is biased by the connection of resistors 614, 616, diode 622 and resistor 624 between the +B supply and ground. The emitter area of transistor 620 is larger than that of diode 622 and, together with the resistance of resistor 624, ensures that the saturation current of transistor 620 has a minimum value of 5 milliamperes.

When a sync pulse is applied to circuit 60 by the sync separator 40, transistors 612 and 610 begin to conduct. Transistor 610 will begin to conduct at a slower rate than transistor 612, due to the integrating action of feedback capacitor 608. The conduction by transistor 612 causes transistor 620 to turn off, with the rise time of the output sync pulse thereby produced being a function of the R-C loading at terminal 16 (not shown). The low (200 ohms) collector-to-emitter saturation resistance of transistor 612 which is coupled to the base of transistor 620 guarantees a minimum collector to emitter breakdown potential of 25 volts at the collector of transistor 620. Bias current from the +B supply which is coupled to the base of transistor 620 by resistors 614 and 616 is also shunted to ground by the conduction of transistor 610, further assuring that transistor 620 will remain nonconducting during the sync pulse.

At the end of the sync pulse, transistor 612 will turn off, permitting transistor 620 to go back into saturation. Transistor 620 will not turn on suddenly, however, because its base bias current is shunted to ground by transistor 610. Transistor 610 will turn off slowly due to integrating capacitor 610, thereby ensuring a slow transition by transistor 620. The output sync pulse produced at the collector of transistor 620 will thus have a slight exponential curve at its trailing edge, which will prevent radiation from the falling edge of the sync pulse at terminal 16.

Latching circuit 70 and sync separator recovery circuit 250 are schematically illustrated in FIG. 5. A detailed discussion of latching circuit 70 may be found in my copending U.S. patent application Ser. No. 934,835, entitled "AGC Keying Signal Circuit", and a detailed discussion of the sync separator recovery circuit 250 may be found in my copending U.S. patent application Ser. No. 934,821, entitled "Synchronization Signal Recovery Circuit", now U.S. Pat. No. 4,185,299 both filed concurrently herewith. Several of the circuit elements of FIG. 5 have been described in conjunction with the preceding drawings and their discussion will be omitted.

The sync signal produced by sync separator 40 is coupled to the base of transistor 210, the collector of transistor 212, and the base of transistor 220 by resistor 216. Transistors 210 and 212 are connected to form a latching device which may be easily implemented in integrated circuit form. The emitter of transistor 210 is coupled to ground and its collector is coupled to the base of transistor 212. Resistor 214 connects the base of transistor 212 to its emitter electrode. The emitter of transistor 220 is coupled to ground, while its collector electrode is coupled to the junction of resistors 226 and 224, and the collector of transistor 222.

Horizontal retrace pulses from keying pulse source 54 are coupled to latching circuit 70 at terminal 18. Diode 244 has its anode electrode coupled to ground and its cathode electrode coupled to terminal 18 and acts to protect the latching circuit from negative excursions of the horizontal retrace pulse. Such negative excursions could cause parasitic carrier injection by transistor 230 into the AGC circuit through transistor 240.

Transistor 242 has its emitter electrode coupled to terminal 18 and its collector electrode coupled to ground. The base electrode of transistor 242 is coupled to the +B supply. Transistor 242 acts to maintain the D.C. voltage level at terminal 18 at one $V_{be}$ above the voltage level of the +B supply.

Resistor 246 is coupled to provide a signal path for the retrace pulses from terminal 18 to conductor 264. Resistor 238 couples the retrace pulses to the latching device at the emitter of transistor 212. Resistor 238 also couples the keying pulses to the collector of transistor 230 and the base of transistor 230 by way of resistor 232. The emitter of transistor 230 is coupled to the base of transistor 222 and to the base of transistor 240 by way of transistor 236. The emitter of transistor 230 is also coupled to sync separator recovery circuit 250 by conductor 170. Resistor 234 is coupled between the base and emitter electrodes of transistor 230. The collector-to-emitter path of transistor 240 is coupled between conductor 264 and ground.

Transistor 222 is coupled in a diode configuration, with its emitter electrode coupled to ground and a resistor 224 coupled between its base and collector electrodes. The collector of transistor 222 is coupled to AGC circuit 20 by resistor 226 and conductor 266.

In normal operation, a horizontal retrace pulse is applied to terminal 18 concurrent with the arrival of a sync pulse at the base of transistor 210. The sync pulse turns on transistor 210, which in turn causes transistor 212 to conduct. Current from the retrace pulse is coupled to the emitter of transistor 212 to maintain the conduction of transistors 210 and 212. The sync pulse also turns on transistor 220, preventing any current flow to AGC circuit 20 through conductor 266. The conduction of collector current in transistor 220 through resistor 224 and away from the base of transistor 240 maintains transistor 240 in a nonconducting state. Since transistor 240 is turned off, the retrace pulse of terminal 18 will be conducted to AGC circuit 20 through resistor 246 and conductor 264 and the AGC circuit will be keyed into operation.

It is seen that transistors 210 and 212 provide for the transmission of a keying signal of substantially constant pulse width to the AGC circuit. This is because latching transistors 210 and 212 will continue to conduct, or remain latched, for the duration of the horizontal retrace pulse which is applied to resistor 214 and the emitter of transistor 212. Once the latching device has been latched by the coincidence of a sync pulse at the base of transistor 210, and a retrace pulse at the emitter of transistor 212, base current for transistor 210 will be supplied by current from the horizontal retrace pulse which is conducted to the base of transistor 210 by the emitter-to-collector path of transistor 212. Even after a 2.5 microsecond equalizing pulse or a 5 microsecond horizontal sync pulse has ended, transistors 210 and 212 will remain latched due to this current from the horizontal retrace pulse. Moreover, the latch will stop conducting after the horizontal retrace pulse has ended, even if the pulse at the base of transistor 210 is a 29 microsecond broad vertical pulse, because collector current for transistor 210 and emitter current for transistor 212 is no longer available. Latching transistors 210 and 212 thus ensure that a substantially constant duration keying pulse signal is coupled to AGC circuit 20 by conductor 264, regardless of the duration of the sync pulse provided by sync separator 40.

When the keying pulse and the sync pulse are out of synchronization, the AGC circuit will not be keyed into operation. Instead, a small pulse will be coupled to the AGC circuit 20 through conductor 266 to cause the AGC filter capacitor 24 to charge slightly toward ground, thereby slowly increasing the gain in the television receiver. This operation occurs as follows.

The arrival of a sync pulse at the base of transistor 210 without the concurrence of a retrace pulse at terminal 18 will not latch transistors 210 and 212. Transistor 210 will try to turn on, but since no retrace pulse current is available at its collector or at the emitter of transistor 212, the transistors will not latch. Since no keying pulse is produced at terminal 18 for conduction to the AGC circuit through conductor 264, the AGC circuit will not be keyed into operation.

When a retrace pulse is supplied to terminal 18 unaccompanied by a sync pulse at the base of transistor 210, the latching circuit defeats transmission of a keying pulse to the AGC circuit on conductor 264. Current from the retrace pulse will flow through resistors 238 and 232, thereby causing transistor 230 to conduct. A small amount of keying pulse current is then conducted through the collector-emitter path of transistor 230 and into the base of transistor 240, causing that transistor to conduct. The retrace pulse at the junction of resistor 246 and conductor 264 will thus be conducted to ground by transistor 240, preventing the transmission of a keying pulse to AGC circuit 20.

Retrace pulse current conducted by transistor 230 is also coupled to resistor 224 and the bases of transistors 222 and 252. A positive pulse is coupled to AGC circuit 20 from the emitter of transistor 230 by resistors 224 and 226 and conductor 266, attenuated substantially by the conduction of transistor 222. This pulse causes AGC circuit 20 to charge the AGC filter capacitor slowly toward ground to gradually increase the gain of the R.F. and I.F. amplifying stages of the television receiver.

The conduction of current to transistor 252 activates the sync separator recovery circuit 250. Transistor 252 will turn on in response to the flow of current into its base electrode and will conduct current through collector resistor 254, its collector-to-emitter path, and emitter resistor 258 to ground. Diode 256 is coupled between resistor 254 and the +B supply to match the emitter to base voltage drop of transistor 260. The conduction of transistor 252 causes transistor 260 to turn on and conduct current from the +B supply through emitter resistor 262. Collector current from transistor 260 charges peak detector capacitor 28 in the sync separator to a higher voltage level, so that the peak detector will quickly track upward to reacquire the missing sync signal. Sync separator recovery circuit 250 thus enables the sync separator to recover from an out-of-sync condition faster than its normally slow operation will permit.

AGC circuit 20 of FIG. 1 is shown in schematic diagram form in FIG. 6. Other elements illustrated in FIG. 1 are shown in FIG. 6 in block diagram form, and retain the same reference numerals. A thorough discussion of AGC circuit 20 may be found in my copending U.S. patent application Ser. No. 934,823, entitled "Keyed AGC Circuit", filed concurrently herewith.

The video signal developed at the emitter of transistor 101 is coupled by resistor 306 to an input switch including transistors 302 and 304. The emitter electrode of transistor 302 is coupled to ground by resistor 308 and its collector electrode is coupled to the base of transistor 304. The collector transistor 304 is coupled to ground and the emitter of transistor 304 is coupled to the base of transistor 302 and to ground by resistor 310. Collector voltage for transistor 302 is maintained by transistor 314, which has its collector electrode coupled to the +B supply and its emitter electrode coupled to the collector of transistor 302 by resistor 312. Bias current for transistor 314 is provided by resistor 316, which is coupled between the base of transistor 314 and the +B supply, and resistor 318, which is coupled from the base of transistor 314 to the 2 $V_{be}$ point of the $V_{be}$ supply 80.

An inverted video signal is coupled from the collector of transistor 302 to the base of transistor 320, which is a dual-emitter transistor connected in an emitter follower configuration. The collector of transistor 320 is coupled to the +B supply, while one emitter electrode is coupled to the collector of transistor 328 and the other emitter electrode is coupled to the base of transistor 328 by resistor 322. Transistor 328 has its emitter electrode coupled to ground and its base electrode coupled to ground by the parallel combination of forward biased diode 326 and resistor 324.

The junction between the first emitter of transistor 320 and the collector of transistor 328 is coupled to a peak detector capacitor 330 by resistor 332. Capacitor 330 is coupled from resistor 332 to ground. Also coupled to the junction of resistor 332 and capacitor 330 is the base of a sampling transistor 370 and the anode of diode 340. Diode 340 provides a controllable discharge path for capacitor 330 by the series coupling from its cathode electrode of resistors 342, 344, and 346 to ground. Sampling transistor 370 has its collector electrode coupled to ground and its emitter electrode coupled to the base of transistor 372.

A switching transistor 350 has the keying pulse from conductor 264 of the latching circuit 70 coupled to its base electrode to switch the keyed AGC circuit 20 into operation. Transistor 350 has its collector electrode coupled to the +B supply and its emitter electrode coupled to the junction of resistors 342 and 344. The junction of resistors 344 and 346 is coupled to a current mirror at the base electrode of transistor 352 and the anode electrode of diode 348. The cathode of diode 348 and the emitter electrode of transistor 352 are coupled to ground. The collector electrode of transistor 352 is coupled to the junction of resistor 356 and the base of transistor 360. Resistor 356 is coupled to the cathode of diode 354, which has its anode electrode coupled to the +B supply.

PNP transistor 360 provides a current source for AGC filter capacitor 24, and has its emitter electrode coupled to the +B supply by a resistor 362 and its collector electrode coupled to the AGC filter capacitor at terminal 22. Terminal 22 is also coupled to an AGC transfer circuit 400 which couples AGC control voltage to the I.F. and R.F. amplifying stages in the television receiver (not shown).

The keying pulse from conductor 264 is also coupled to the emitter of transistor 372, which has its collector electrode coupled to the junction of resistors 374 and the base of transistor 380. Resistor 374 is coupled to the anode of diode 376 and conductor 266 from the latching circuit 70. The cathode of diode 376 is coupled to ground.

NPN transistor 380 provides a current sink for AGC filter capacitor 24 and the current supplied by current source transistor 360. Transistor 380 has its emitter electrode coupled to ground and its collector electrode coupled to the AGC filter capacitor and the collector of transistor 360 at terminal 22.

In operation, a negative-going video signal including a synchronizing signal component is coupled to the base of input switch transistor 302 by transistor 101. The video signal is inverted by transistor 302 and appears at the base of transistor 320 as a positive-going signal. It is seen that a weak video signal or a normal video signal containing high, (9 volt) white level video information will cause transistor 302 to saturate. As transistor 302 saturates and the voltage on its collector electrode drops to the voltage level of its emitter electrode, base current will be injected into the collector of the transistor and its collector voltage will begin to rise. This over-saturation condition would result in the detection of an incorrect signal level on peak detector capacitor 330. This undesirable operating condition is prevented by transistor 304, which acts to conduct excess current away from the collector of transistor 302 through its base-collector path to ground after transistor 302 has reached its saturation level.

Transistor 314 limits the maximum voltage of the inverted video signal at the base of transistor 320 to 8 volts. This voltage clamp ensures that the voltage breakdown of peak detector capacitor 330 of 8 volts is not exceeded.

The positive video signal at the base of transistor 320 causes that transistor to conduct current through resistor 332 to charge peak detector capacitor 330 to the amplitude of the sync signal components of the video signal. The maximum amplitude of the sync tips will be stored on capacitor 330. The keying pulse applied to the base of transistor 350 will turn on transistor 350 to reverse bias diode 340 for the duration of the keying pulse. This prevents discharge of capacitor 330 through diode 340 and resistors 342, 344 and 346 for the duration of the keying pulse.

It was found that as capacitor 330 charges to the voltage level at the base of transistor 320, the emitter impedance at the junction of transistor 320 and resistor 332 increases. The increasing impedance results in the charging of capacitor 330 to a value below the sync tip for short sync pulses, such as the equalizing pulses. The voltage level stored on capacitor 330 thus becomes a function of sync pulse duration and amplitude, instead of purely pulse amplitude. This problem is overcome in the present invention by the operation of transistor 328, which is controlled by the second emitter of transistor 320. As transistor 320 conducts current through its two emitter electrodes, transistor 328 will be driven into conduction by current from the second emitter of transistor 320. As transistor 328 conducts current through its collector to emitter path, its collector current causes impedance at the first emitter electrode of transistor 320 to remain low. The collector current of transistor 328 clamps the increasing emitter impedance of transistor 320 at a low level relative to the impedance of resistor 332, thereby allowing capacitor 330 to charge to the maximum sync tip level.

As mentioned previously, the keying pulse from the latching circuit 70 will cause transistor 350 to turn on, reverse-biasing diode 340. Transistor 350 also conducts current to the base of transistor 352, turning that transistor on. The level of the rectified keying signal at the emitter of transistor 350 is determined by the voltage level of capacitor 330, as this level is translated up 2 $V_{be}$'s (1.2 volts) by the base to emitter junction of transistors 370 and 372, and down one $V_{be}$ by the base to emitter junction of transistor 350. The current conducted to the base of transistor 352 is thus a function of the sync tip level voltage stored on capacitor 330. Conduction by transistor 352 causes transistor 360 to conduct, thereby supplying charging current to the AGC filter capacitor 34. Some or all of the charging current conducted by transistor 360 will be conducted away from the AGC filter capacitor by current sink transistor 380, as discussed below.

The keying pulse supplied by the latching circuit 70 also provides a source of emitter current for transistor 372. The base of transistor 372 is coupled to the emitter of transistor 370 which provides a signal determined by the voltage level stored on peak detector capacitor 330. Transistor 370 is coupled between capacitor 330 and the base of transistor 372 because transistor 372 is a low beta transistor which requires a relatively large base current. Transistor 370 is a high beta transistor requiring a relatively small base current which does not adversely affect the charge stored on capacitor 330.

The current flow through the emitter to collector path of transistor 372 is coupled to the base of current sink transistor 380, causing this transistor to conduct. Current sink transistor 380 acts to discharge the AGC filter capacitor 24 toward ground under weak signal conditions when the gain of the receiver is to be increased. Under these signal conditions, current source transistor 360 supplied less charging current than is conducted by current sink transistor 380, resulting in a net discharge of AGC filter capacitor 24. Under strong signal conditions, current source transistor 360 supplies more current than current sink transistor 380 conducts, resulting in a net charging of AGC filter capacitor 24. When the sync tip of the video signal is at the proper voltage level and no AGC gain correction is required, the current supplied by current source transistor 360 precisely matches the current conducted by current sink transistor 380, resulting in no net change of the voltage level on the AGC filter capacitor. These matched source and sink currents will be of the same magnitude, regardless of the level of the voltage on the AGC filter capacitor 24.

When the latching circuit 70 is not keying AGC circuit 20 into operation during the horizontal trace interval, transistor 320 will attempt to charge capacitor 330 to the maximum amplitude of the video signal. Peak detector capacitor 330 cannot retain an appreciable charge during the trace interval, however, because diode 340 remains forward biased during this time and continually discharges capacitor 330 through resistors 342, 344 and 346. This discharge path prevents the retention of the peak amplitude of the video signal and impulse noise pulses on capacitor 330 during the trace interval, which retained charge would cause AGC circuit 20 to falsely set up in response to the noise pulse peaks during the succeeding keying interval. The discharge path thus obviates the need for complex noise protection circuits in AGC circuit 20.

Current source transistor 360 and current sink transistor 380 present a high impedance output to the AGC filter capacitor 24 during the horizontal trace interval. This is because transistors 360 and 380 are not conducting during this time and are coupled to AGC filter capacitor 24 at their high impedance collector electrodes. The high impedance at terminal 22 thus prevents undesirable changes in the AGC control voltage due to current leakage during the trace interval. The use of current source and sink transistors in the present invention obviates the need for low impedance charging and discharging means for AGC filter capacitor 24, such as resistors coupled from terminal 22 to the +B supply or ground, respectivey. Such low impedance charging and discharging means are a common cause of undesirable changes in the AGC control voltage in the prior art.

When the latching circuit 70 receives a horizontal retrace pulse which is not in coincidence with a sync pulse, no keying pulse is generated on conductor 264 and a small positive pulse is generated on conductor 266. This small positive pulse is coupled to the base of transistor 380 by resistor 374, causing that transistor to conduct slightly. The slight conduction of current sink transistor 380 results in a slight discharge toward ground of AGC filter capacitor 24 and a small increase in gain in the R.F. and I.F. circuits of the television receiver. Since this out-of-sync condition usually results from the reception of a weak video signal, the slight increase in gain enables the sync separator 40 and the latching circuit 70 to quickly reacquire synchronization. The slight conduction of transistor 380 also offsets any small flow of undesired charging current into the filter capacitor 24 from the AGC transfer circuit 400.

When a very strong video signal is coupled to terminal 12 by video amplifier 4, which may occur when the television channel has been changed or when the receiver is first turned on, the condition known as "AGC lockout" may occur. In this condition, the entire video signal may be strong enough to exceed the D.C. threshold of noise inverter 30. The noise inverter 30 will thus interpret the video signal as a steady state noise pulse and will invert the entire video signal, resulting in its cancellation at the output of the noise inverter. In prior art circuits of the type in which the noise inverter output is coupled directly to the video signal input of the AGC circuit, the AGC circuit would respond to the steady-state output of the noise inverter as if it were a weak video signal and would increase the gain of the R.F. and I.F. circuits. The increase in gain would therefore prolong the AGC lockout condition.

In the present invention, however, the noise inverter 30 is coupled to the peak detecting sync separator 40. The steady-state signal is coupled to the base of transistor 144 in FIG. 2 and also to the base of transistor 150, which increases the signal lever by one $V_{be}$ and applies it to the base of transistor 146. The one $V_{be}$ differential in signal levels at the bases of transistors 144 and 146 will cause transistor 146 to conduct, turning on transistor 160. The sync separator 40 will thus generate a continuous high-level sync signal at the collector of transistor 160, which is coupled to latching circuit 70. The continuously high sync signal will enable the coupling of every horizontal retrace pulse to the AGC circuit 20 on conductor 264 and will prevent any increase in system gain by grounding conductor 266 through transistor 220 in FIG. 5. Sync separator recover circuit 250 will also be disabled by current conduction through resistor 224 and transistor 220 and away from conductor 170, preventing any upward tracking of peak detector capacitor 28. The AGC circuit 20 will therefore be keyed into operation during the AGC lockout condition by keying pulses on conductor 264, and will quickly respond to the strong signal level at terminal 12 and the base of transistor 320 by reducing the gain of the R.F. and I.F. circuits so that synchronization with the video signal can be reacquired.

What is claimed is:
1. In a television receiver, apparatus comprising:
 a source of video signals which may be contaminated with impulse noise, said video signals containing synchronizing signal components;
 means coupled to said source of video signals for inverting the impulse noise in said video signals which exceeds a predetermined threshold level;
 means coupled to said source of video signals for delaying said video signals;
 means coupled to the output of said noise inverting means and the output of said delaying means for combining said delayed video signals with said inverted impulse noise to produce noise cancelled video signals;
 peak detecting means direct current coupled to the output of said combining means for generating a reference voltage related to the synchronizing signal components of said noise cancelled video signals;
 a comparator responsive to said noise cancelled video signals and said reference voltage for generating synchronizing signal pulses when the synchronizing signal components of said video signals exceed said reference voltage level;
 a source of recurrent pulses normally in a substantially constant phase relationship with said synchronizing signal pulses;
 means direct current coupled to the output of said synchronizing signal generating means and responsive to said recurrent pulses for producing keying signals upon the coincidence of a synchronizing signal pulse and a recurrent pulse; and
 automatic gain control means coupled to said source of video signals and responsive to said keying signals for producing an AGC control signal.

2. In a television receiver, apparatus comprising:
 a gain controlled source of video signals containing synchronizing signal components and video information components which may be contaminated with impulse noise;
 means responsive to said video signals for producing inverted noise signals corresponding to impulse noise components of said video signals which exceed a predetermined threshold level;
 means coupled to said gain controlled source of video signals for delaying said video signals;
 means coupled to the outputs of said noise inverting means and said delaying means for combining said delayed video signals with said inverted noise signals to produce an output signal normally comprising video signals which are substantially free of impulse noise;
 a peak detector coupled to the output of said combining means for generating a reference voltage related to the peak signal level of said output signal of said combining means;
 means responsive to said output signal of said combining means and said reference voltage for (a) producing synchronizing signal pulses when the output signal of said combining means comprises substantially noise-free video signals and only the synchronizing signal components of said substantially noise-free video signals exceed said reference voltage level, (b) producing a first signal level when said video information components of said video signals exceed said predetermined threshold level and the output signal of said combining means exceeds said reference voltage level, and (c) producing a second signal level when the output signal of said combining means fails to exceed said reference voltage level;
 a source of recurrent pulses normally in a substantially constant phase relationship with said synchronizing signal pulses;
 means coupled to the output of said synchronizing signal pulse producing means and responsive to said recurrent pulses for (a) producing a keying signal upon the coincidence of a synchronizing signal pulse and a recurrent pulse, or upon the coincidence of said first signal level and a recurrent pulse, and (b) producing an out-of-sync signal upon the coincidence of said second signal level and a recurrent pulse;
 an AGC filter capacitor;
 an automatic gain control circuit coupled to said AGC filter capacitor for developing an AGC control voltage across said capacitor; and
 means for rendering said gain controlled source of video signals responsive to said AGC control voltage,
 wherein said automatic gain control circuit is responsive to said keying signal to vary said AGC control voltage as a function of the level of said video signals, and responsive to said out-of-sync signal to vary said AGC control voltage in a direction which increases the gain of said gain controlled source of video signals.

3. The apparatus of claim 2, further comprising:
 a recovery circuit having an input coupled to said coincidence means and an output coupled to said peak detector and responsive to said out-of-sync signal for varying said reference voltage level.

4. Television receiver apparatus for developing synchronizing signals and an automatic gain control voltage from a composite video signal which may be contaminated with impulse noise, comprising:
 a D.C. threshold noise inverter which inverts impulse noise in said composite video signal which exceeds a predetermined threshold level;
 means for delaying said composite video signal and combining said delayed video signal with said inverted impulse noise to produce a noise cancelled composite video signal;
 peak detecting means for normally separating synchronizing signals from said noise cancelled composite video signal, wherein said peak detecting means further produces a first level D.C. signal upon its reception of a composite video signal having a level insufficient for normal separation, and a second level D.C. signal upon its reception of a composite video signal in which the synchronizing signal components have been inverted and cancelled by said D.C. threshold noise inverter and said delaying and combining means;
 a source of repetitive pulses normally in time coincidence with the synchronizing signal components of said composite video signal;
 a keying signal circuit coupled to said peak detecting means and said repetitive pulse source which is (a) responsive to the coincidence of a synchronizing signal and a repetitive pulse for generating a keying signal, (b) responsive to the coincidence of a repetitive pulse with said first level D.C. signal for generating an out-of-sync signal, and (c) responsive to the coincidence of a repetitive pulse with said second level D.C. signal for generating said keying signal; and
 an automatic gain control voltage generator responsive to said composite video signal and said keying signal for developing an automatic gain control voltage which is related to the amplitude of said composite video signal, and responsive to said out-of-sync signal for modifying said automatic gain control voltage so as to increase the gain of the television receiver.

5. The apparatus of claim 4, further comprising:
 means responsive to said out-of-sync signal for supplying charging current to said peak detecting means, wherein said peak detecting means will separate synchronizing signals from a composite video signal having a level insufficient for normal separation.

6. In a television receiver, apparatus which is responsive to the level of synchronizing signal components of a composite video signal for developing an automatic gain control voltage, comprising:
 means having variable gain for amplifying intermediate frequency composite video signals;
 means for converting said amplified intermediate frequency signals to amplitude-varying composite video signals containing synchronizing signal components;
 a source of recurrent pulses normally in time coincidence with said synchronizing signal components;
 means for generating a keying signal when said recurrent pulses are in time coincidence with said synchronizing signal components;
 means for generating an out-of-sync signal when said recurrent pulses do not occur in time coincidence with said synchronizing signal components;
 a filter capacitor coupled to said amplifying means; and
 signal translating means responsive to said amplitude varying composite video signals and said keying signal for altering the charge of said filter capacitor so as to vary the gain of said amplifying means as a function of the signal level of said synchronizing signal components when said recurrent pulses are in time coincidence with said synchronizing pulse components, and responsive to said out-of-sync signal for altering the charge of said filter capacitor in a direction which increases the gain of said amplifying means when said recurrent pulses do not occur in time coincidence with said synchronizing signal components.

7. In a television receiver, apparatus which is responsive to the level of synchronizing signal components of a composite video signal for developing an automatic gain control voltage, comprising:
 means having variable gain for amplifying intermediate frequency composite video signals;
 means for converting said amplified intermediate frequency signals to amplitude-varying composite video signals containing synchronizing signal components;
 a source of recurrent pulses normally in time coincidence with said synchronizing signal components;
 means for generating a keying signal when said recurrent pulses are in time coincidence with said synchronizing signal components;
 means for generating an out-of-sync signal when said recurrent pulses do not occur in time coincidence with said synchronizing signal components;
 a filter capacitor coupled to said amplifying means; and
 signal translating means responsive to said amplitude-varying composite video signals and said keying signal for altering the charge of said filter capacitor so as to vary the gain of said amplifying means as a function of the signal level of said synchronizing signal components when said recurrent pulses are in time coincidence with said synchronizing pulse components, and responsive to said out-of-sync signal for altering the charge of said filter capacitor in a direction which increases the gain of said amplifying means when said recurrent pulses do not occur in time coincidence with said synchronizing signal components,
 wherein said signal translating means comprises a first signal path responsive to said keying signal and the level of said synchronizing signal components for generating a charging signal and a first output transistor having a high impedance output electrode coupled to said filter capacitor and responsive to said charging signal for charging said filter capacitor, and
 a second signal path responsive to said keying signal and the level of said synchronizing signal components for generating a discharging signal and a second output transistor having a high impedance output electrode coupled to said filter capacitor and responsive to said out-of-sync signal for discharging said filter capacitor.

8. In a television receiver, apparatus comprising:

a source of composite video signals containing synchronizing signal components;

peak detecting means responsive to said composite video signals for generating a reference voltage level related to the synchronizing signal components of said composite video signals;

means responsive to said composite video signals and said reference voltage for generating synchronizing signal pulses when the synchronizing signal components of said composite video signals exceed said reference voltage level;

a source of recurrent pulses normally in a substantially constant phase relationship with said synchronizing signal pulses;

means responsive to said synchronizing signal pulses and said recurrent pulses for generating a signal upon the coincidence of a synchronizing signal pulse and a recurrent pulse;

means responsive to said recurrent pulses and said coincidence signal for generating an out-of-lock indication signal upon the occurrence of a recurrent pulse which is not in coincidence with a synchronizing signal phase; and means coupled to said peak detecting means for varying said reference voltage level in response to said out-of-lock indication signal.

* * * * *